Oct. 14, 1952          T. E. NELSON          2,613,960
OIL SEAL
Filed Dec. 1, 1949
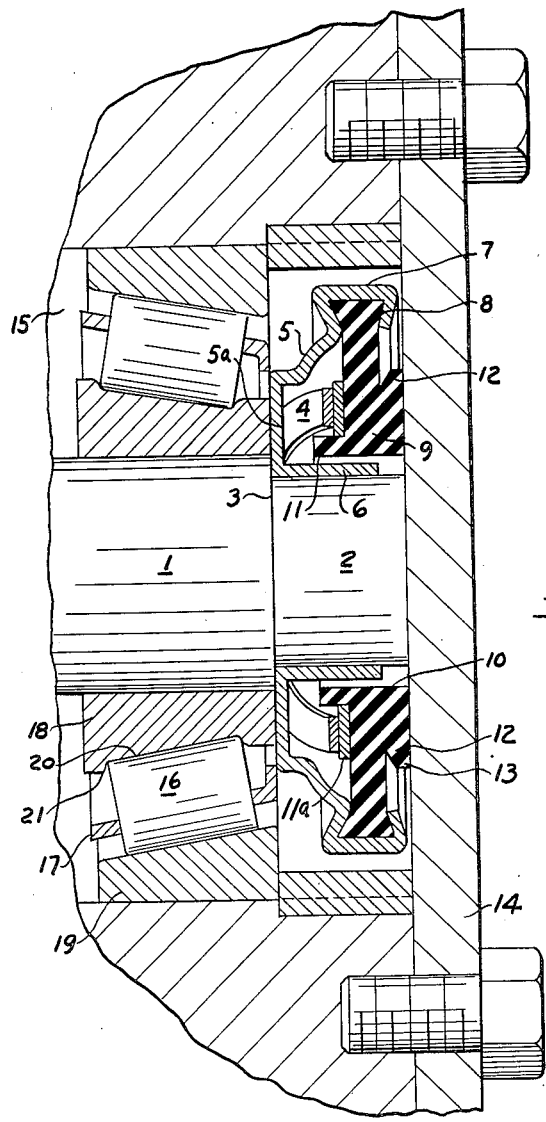
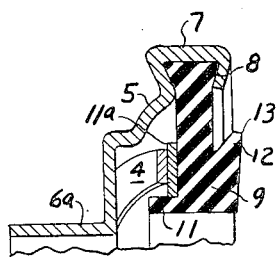
INVENTOR.
THOMAS EDWARD NELSON.
BY
ATTORNEY.

UNITED STATES PATENT OFFICE 2,613,960

OIL SEAL

Thomas Edward Nelson, Pontiac, Mich.

Application December 1, 1949, Serial No. 130,484

1 Claim. (Cl. 286—11)

This invention relates to oil seals, the object being to provide a new and improved oil seal mounted to rotate with a rotatable member.

These and other features and objects of the invention are hereinafter more fully described and claimed and the preferred form of the invention is shown in the accompanying drawing in which—

Fig. 1 is a sectional view of the sealing ring in association with a shaft in a housing.

Fig. 2 shows a section of the sealing ring and the retainer therefor.

As shown in Fig. 1 the shaft is indicated at 1 and has an end 2 of less diameter than the body portion of the shaft thereby providing a shoulder 3. On the portion 2 of the shaft is positioned a sealing device including a ring 4 of a wave type in a chambered ring 5 which has a flange 6 on the portion 2 of the shaft and a peripheral portion 7 which is shaped to provide an annular recess 8. The recess is of greatest width at its outer periphery to receive a rubber ring 9 which has a central aperture 10 in which the flange 6 is positioned. The ring 9 also has an inwardly extending flange 11 and on the said flange is a metal washer 11a which is maintained in place by the ring 4. The ring 9 has a portion 12 normally outwardly inclined relative to the plane of the ring as shown in Fig. 2.

By such arrangement the end 13 of said portion 12 is maintained in pressure contact with the inner face of the plate 14 thereby sealing the chamber 15 in which the bearing members 16 are positioned. The bearing members 16 are here shown as being of the roller type and each normally lie in an aperture provided therefor in the flange of a retainer 17.

On the end portion 2 of the shaft is a chambered ring 5 which has a flange 6 positioned on the end portion 2 of the shaft 1. The said ring has a flange 6 positioned on the portion 2 of the shaft and the periphery of the ring is formed to provide an annular recess 8 the opposite sides of which are inwardly inclined. The rubber ring 9 is shaped at its periphery to engage in the recess 8 and has an inwardly extending flange 11 on which is a metal washer 11a. The wave ring 4 has portions engaging the washer 11a and portions engaging the inner surface 5a of the chambered ring 5 in sequence.

The flange 12 of the ring 5 normally lies at an angle greater than a right angle to the axis of the shaft and is positioned between the ring 18 on the shaft and an outer ring 19. The flange 17 is apertured to receive the bearing members 16 which lie between the inner and outer rings 18 and 19 and preferably the outer inclined face 20 of the inner ring 18 is recessed as indicated at 21 whereby displacement of the rollers longitudinally of the shaft is prevented.

A slightly different arrangement is shown in Fig. 2 in that the flange 6a extends inwardly instead of outwardly as shown at 6 in Fig. 1 and, while I have shown a wave ring for maintaining the sealing ring in pressure contact with the closure plate 14, other means may be employed for such purpose within the spirit and scope of the invention as herein disclosed and claimed.

By the described character and relationship of parts leakage of oil from the chamber 15 is prevented.

Having thus briefly described my invention, its utility and mode of operation, what I claim and desire to secure by Letters Patent of the United States is:

An oil seal for use in conjunction with a shaft rotatably supported within a housing having an end wall extending in a plane transverse to the axis of said shaft, comprising a ring-like retainer having an axially elongated annular hub secured on the shaft and a peripheral portion defining an annular recess opening radially inward with the throat thereof of reduced width, a resilient sealing element of ring-like form peripherally secured within said retainer recess arranged at right angles to the shaft axis and centrally apertured to surround said hub in spaced relation for longitudinal flexing movement independently thereof, said sealing element having an axially directed central annular flange on one side thereof with its outer surface portions normally inclined outwardly towards its periphery, said flange being annularly undercut at its maximum diameter at said sealing element to facilitate flexing of the outer inclined surface of said flange for surface registry with said end wall and an inwardly directed central annular flange upon its other side adjacent its aperture, a washer upon said latter flange, and a wave spring positioned between and oppositely engaging against said retainer and said washer for maintaining the flange on said one side in wiping surface contact with the end wall of said housing.

THOMAS EDWARD NELSON.

REFERENCES CITED

The following references are of record in the file of this patent:

UNITED STATES PATENTS

| Number | Name | Date |
| --- | --- | --- |
| 2,080,669 | Nelson | May 18, 1937 |
| 2,233,624 | Magnesen | Mar. 4, 1941 |
| 2,264,739 | Boden | Dec. 2, 1941 |
| 2,265,951 | Miner | Dec. 9, 1941 |
| 2,373,443 | Armington | Apr. 10, 1945 |
| 2,486,088 | Yaros | Oct. 25, 1949 |